(12) United States Patent
Lane

(10) Patent No.: US 7,353,633 B1
(45) Date of Patent: Apr. 8, 2008

(54) SPRING AUGMENTED FISHHOOK

(76) Inventor: Nathan C Lane, 11931 Freeway Pl., Everett, WA (US) 98208

(*) Notice: Subject to any disclaimer, the term of this patent is extended or adjusted under 35 U.S.C. 154(b) by 16 days.

(21) Appl. No.: 11/163,706

(22) Filed: Oct. 27, 2005

(51) Int. Cl.
A01K 1/10 (2006.01)
A01K 83/00 (2006.01)
A01K 83/02 (2006.01)

(52) U.S. Cl. ............... 43/15; 43/37; 43/42.38
(58) Field of Classification Search ........... 43/15, 43/34–37, 42.72, 42.02, 42.37, 42.38
See application file for complete search history.

(56) References Cited

U.S. PATENT DOCUMENTS

| | | | | |
|---|---|---|---|---|
| 70,868 A | * | 11/1867 | Lenhart | 43/34 |
| 80,151 A | * | 7/1868 | Dennett | 43/34 |
| 408,347 A | * | 8/1889 | Hubbard | 43/34 |
| 893,304 A | * | 7/1908 | Buterbaugh | 43/36 |
| 1,292,860 A | * | 1/1919 | Obermiller | 43/15 |
| 1,379,422 A | * | 5/1921 | Thorsten | 43/34 |
| 1,399,648 A | * | 12/1921 | Partello | 43/37 |
| 1,452,630 A | * | 4/1923 | Walker | 43/34 |
| 1,604,031 A | * | 10/1926 | Ferguson | 43/34 |
| 1,604,725 A | * | 10/1926 | Sprangel | 43/37 |
| 1,745,834 A | * | 2/1930 | Horikoshi | 43/34 |
| 1,851,698 A | * | 3/1932 | Fitch | 43/42.37 |
| 2,154,756 A | * | 4/1939 | Kvitsky | 43/42.37 |
| 2,244,271 A | * | 6/1941 | Voigt | 43/34 |
| 2,260,923 A | * | 10/1941 | Thompson | 43/34 |
| 2,356,712 A | * | 8/1944 | Tessier | 43/37 |
| 2,366,662 A | * | 1/1945 | Weichselbaum | 43/37 |
| 2,385,602 A | * | 9/1945 | Birkemeier | 43/37 |
| 2,559,537 A | * | 7/1951 | Haynie | 43/15 |
| 2,589,533 A | * | 3/1952 | Buchner | 43/15 |
| 2,591,013 A | * | 4/1952 | Sampson | 43/15 |
| 2,591,391 A | * | 4/1952 | Walsh | 43/42.38 |
| 2,616,203 A | * | 11/1952 | Sarakas | 43/42.72 |

(Continued)

FOREIGN PATENT DOCUMENTS

SU 1692459 A1 * 11/1991

(Continued)

Primary Examiner—Darren W. Ark
(74) Attorney, Agent, or Firm—David L. Tingey

(57) ABSTRACT

A spring augmented fishhook comprising a hook member with an eye on a first end of an elongate leg portion and a hook on a second end of the leg portion, a coil spring having a diameter smaller than the eye and forming a spring channel longitudinal through its center through which the elongate leg portion passes, a clip resiliently bending at a point of flexure into elongate first and second clip members, the first clip member passing downward through the eye and then through the channel and extending beyond spring upper and lower ends with a first latch member on its end, and the second clip member extending generally downward with a second latch member on its end matching the first latch member such that the first and second latch members latch together as the first and second clip members are urged together under flexure, the spring held on the hook member leg portion between the eye and the latched first and second clip members as spring stops such that when the hook is pulled downward such as by a fish with the clip stationary relative to the hook member, the spring compresses between the eye and the latched clip members allowing limited movement of the hook against spring bias when initially pulled.

8 Claims, 3 Drawing Sheets

U.S. PATENT DOCUMENTS

| | | | |
|---|---|---|---|
| 2,629,959 A * | 2/1953 | Dalton | 43/37 |
| 2,732,648 A * | 1/1956 | Bryn | 43/42.72 |
| 2,738,610 A * | 3/1956 | Rice | 43/42.37 |
| 2,748,521 A * | 6/1956 | Schaefer | 43/35 |
| 2,754,613 A * | 7/1956 | Rogers et al. | 43/42.38 |
| 2,760,293 A * | 8/1956 | Rupp | 43/42.38 |
| 2,864,198 A * | 12/1958 | Edwards | 43/37 |
| 2,918,745 A * | 12/1959 | Haynie | 43/15 |
| 2,992,507 A * | 7/1961 | Gray | 43/42.38 |
| 3,057,108 A * | 10/1962 | Jacobsen | 43/42.72 |
| 3,066,434 A * | 12/1962 | Duller | 43/42.38 |
| RE26,198 E * | 4/1967 | Rossnan | 43/36 |
| 3,397,477 A * | 8/1968 | Hand | 43/15 |
| 3,483,650 A * | 12/1969 | Weaver | 43/35 |
| 3,618,251 A * | 11/1971 | Hodshire | 43/15 |
| 3,714,730 A * | 2/1973 | Llyod | 43/42.72 |
| 3,795,074 A * | 3/1974 | Mantel | 43/37 |
| 3,803,746 A * | 4/1974 | Riggs | 43/35 |
| 4,011,679 A * | 3/1977 | Smith | 43/15 |
| 4,124,948 A * | 11/1978 | Mautner | 43/15 |
| 4,136,477 A * | 1/1979 | Hines et al. | 43/15 |
| 4,139,960 A * | 2/1979 | Chojnowski | 43/15 |
| 4,141,168 A * | 2/1979 | Nishi | 43/15 |
| 4,215,507 A * | 8/1980 | Russell | 43/42.22 |
| 4,476,646 A * | 10/1984 | Weiman | 43/34 |
| 4,547,990 A * | 10/1985 | Hero | 43/15 |
| 4,848,020 A * | 7/1989 | Lash | 43/42.72 |
| 4,854,070 A * | 8/1989 | Young | 43/34 |
| 4,944,106 A * | 7/1990 | Wu et al. | 43/15 |
| 5,109,624 A * | 5/1992 | Bryan | 43/15 |
| 5,195,268 A * | 3/1993 | Ellis et al. | 43/37 |
| 5,299,378 A * | 4/1994 | Ballard | 43/42.1 |
| 5,446,991 A * | 9/1995 | Brackus | 43/42.37 |
| 5,915,944 A * | 6/1999 | Strunk | 43/42.72 |
| 2006/0064917 A1* | 3/2006 | Cakebread | 43/15 |

FOREIGN PATENT DOCUMENTS

| | | |
|---|---|---|
| SU | 1762838 A2 * | 9/1992 |
| SU | 1762839 A2 * | 9/1992 |

* cited by examiner

SPRING AUGMENTED FISHHOOK

BACKGROUND

This invention relates to fishhook setters and more specifically to a fishhook that is augmented with a spring to set the hook.

The prior art is replete with fishhooks and fishhook setters. In general, a fish contacts the hook and a compressed spring often on a hair trigger is released to set the hook in the fish's mouth. These fishhooks are unnecessarily complex and sensitive in a cocked condition and frequently are unsuccessful in hooking the fish. The sudden release also often results in a missed opportunity if the fish releases the trigger by gentle nudging before it attempts to swallow the baited hook or if the sudden release rips through the fish.

The object of the present invention is to provide a fishhook that employs an uncompressed spring prior to engagement with a fish. It is another object that the fishhook not require a trigger that releases the spring in setting the hook in the fish. It is another object that the fishhook be augmented by a spring in a rest condition compressed by the fish only as it pulls on the hook. It is also an object that the hook tolerate some movement of the fish against the hook before the hook is set allowing the hook to significantly engage the fish gently before it is set. It is a further object that the fishhook provide an attachment apparatus that allows attachment and exchange of bait, fishing lures, floats and weights without retying a fishing line.

SUMMARY

These objects are achieved in a fishhook that employs a hook member and a clip member to which a fish line may attach each with an elongate portion that passes longitudinally through the center of a coil spring from opposite spring ends and ending in an effective stop against the coil spring at opposite spring ends. Thus, when the hook member and the clip member are pulled apart, the coil spring is compressed between those effective stops. The fishhook then operates with the coil spring uncompressed in wait condition with a fish line on the clip. When a fish pulls on the hook, the coil spring gently compresses allowing the hook to significantly engage the fish moderated force for a distance as the spring compresses. The spring compresses only by action of the fish smoothly moderating the pull of the fish to set the hook in the fish without tearing through the fish, complementing the spring action of the fishing pole also designed to smoothly modulate the tug of the fish on the hook.

The clip latches into attachment with the hook and coil spring. When unlatched various fishing paraphernalia can be attached to the clip without untying a fishing line, which is also tied to the clip. Such paraphernalia might include bait, a fishing lure, a float and/or weights and other similar fishing aids. The clip is then latched, securing the fishing paraphernalia to the fishhook.

DETAILED DESCRIPTION OF THE PREFERRED EMBODIMENT

Figure 1:
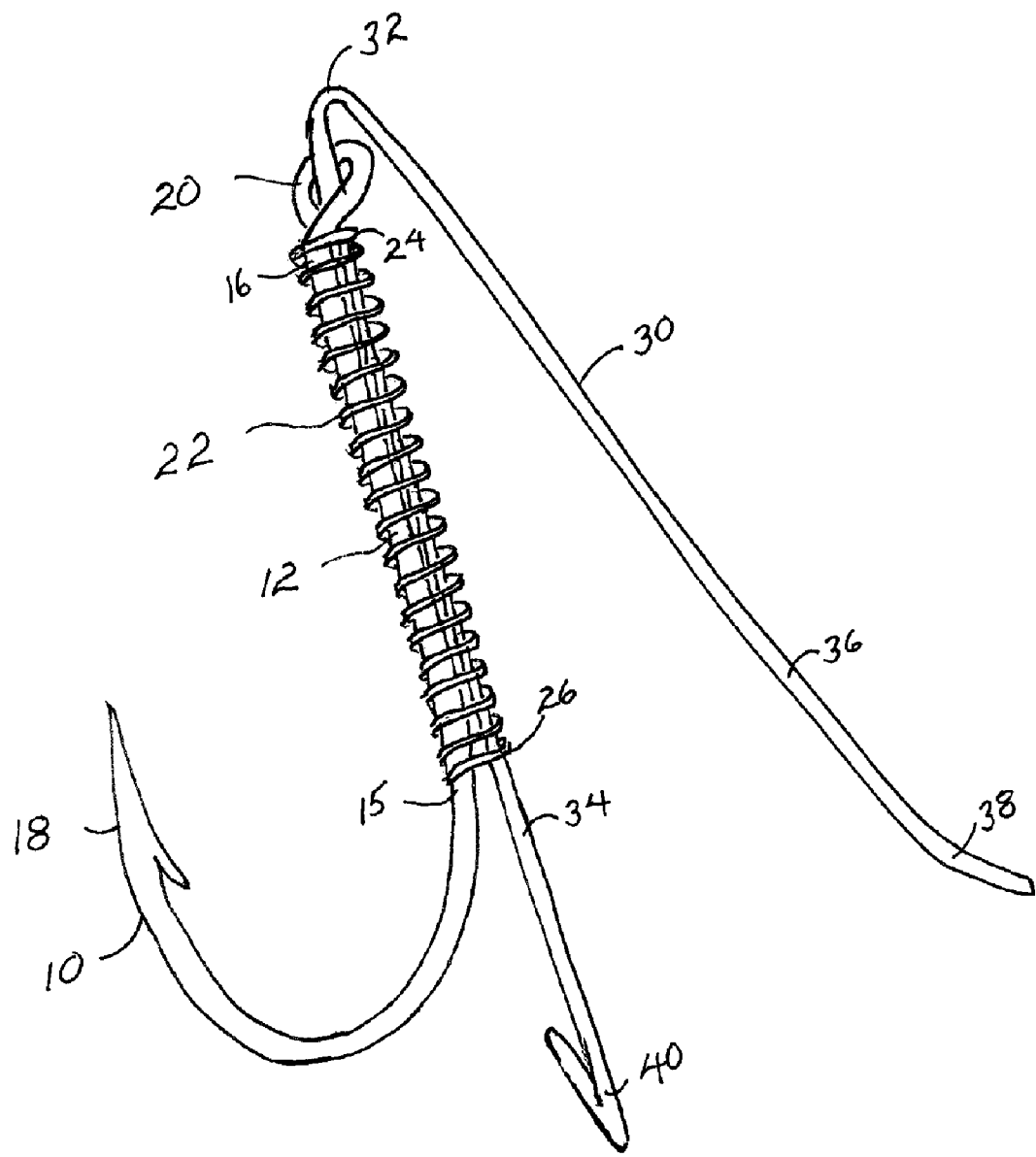
FIG. 1 is an artistic view of the fishhook of the present invention showing hook and clip members through a coil spring.
Figure 2:
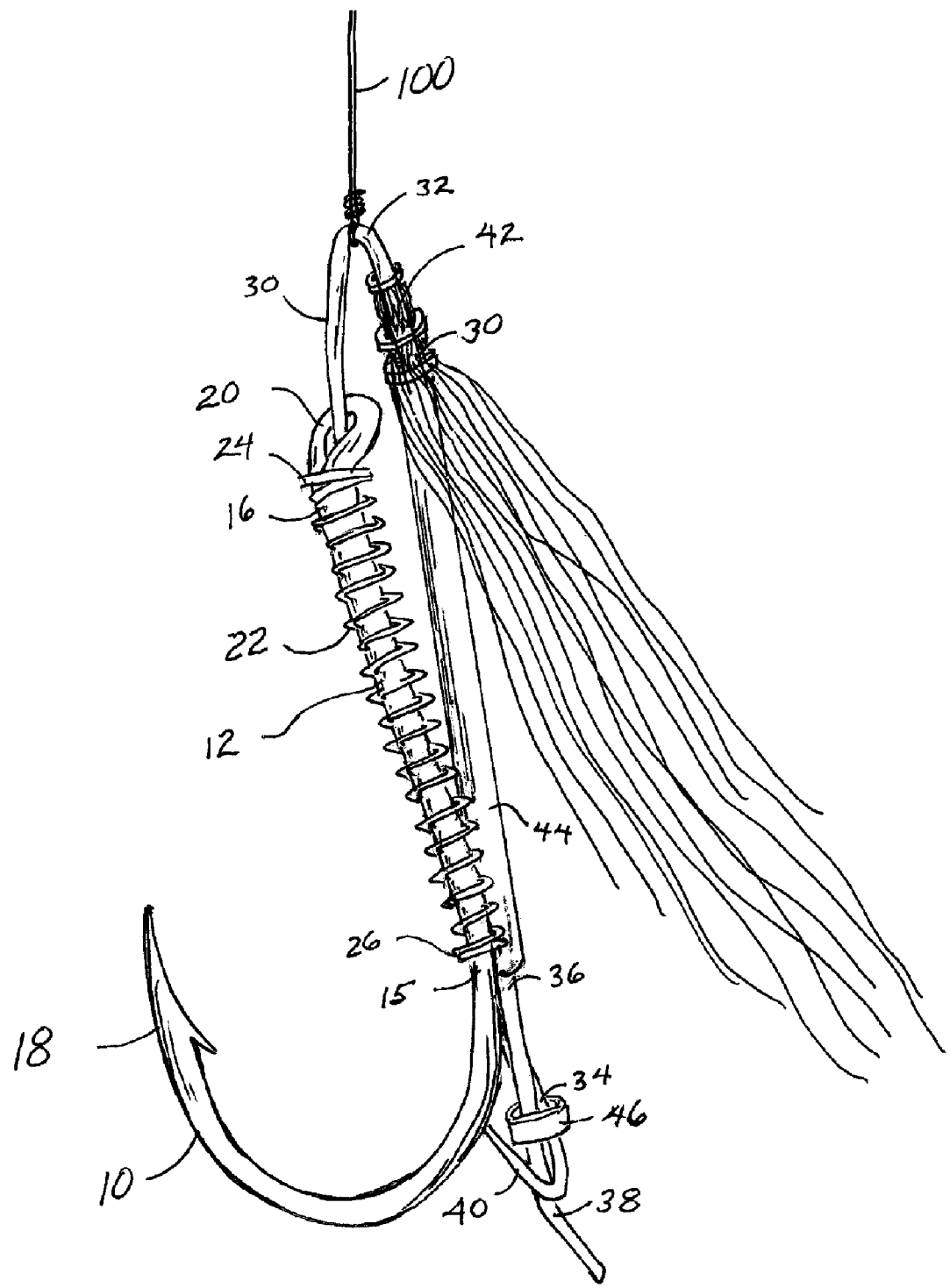
FIG. 2 is a perspective view of the fishhook of FIG. 1 showing the clip members unlatched.
Figure 3:
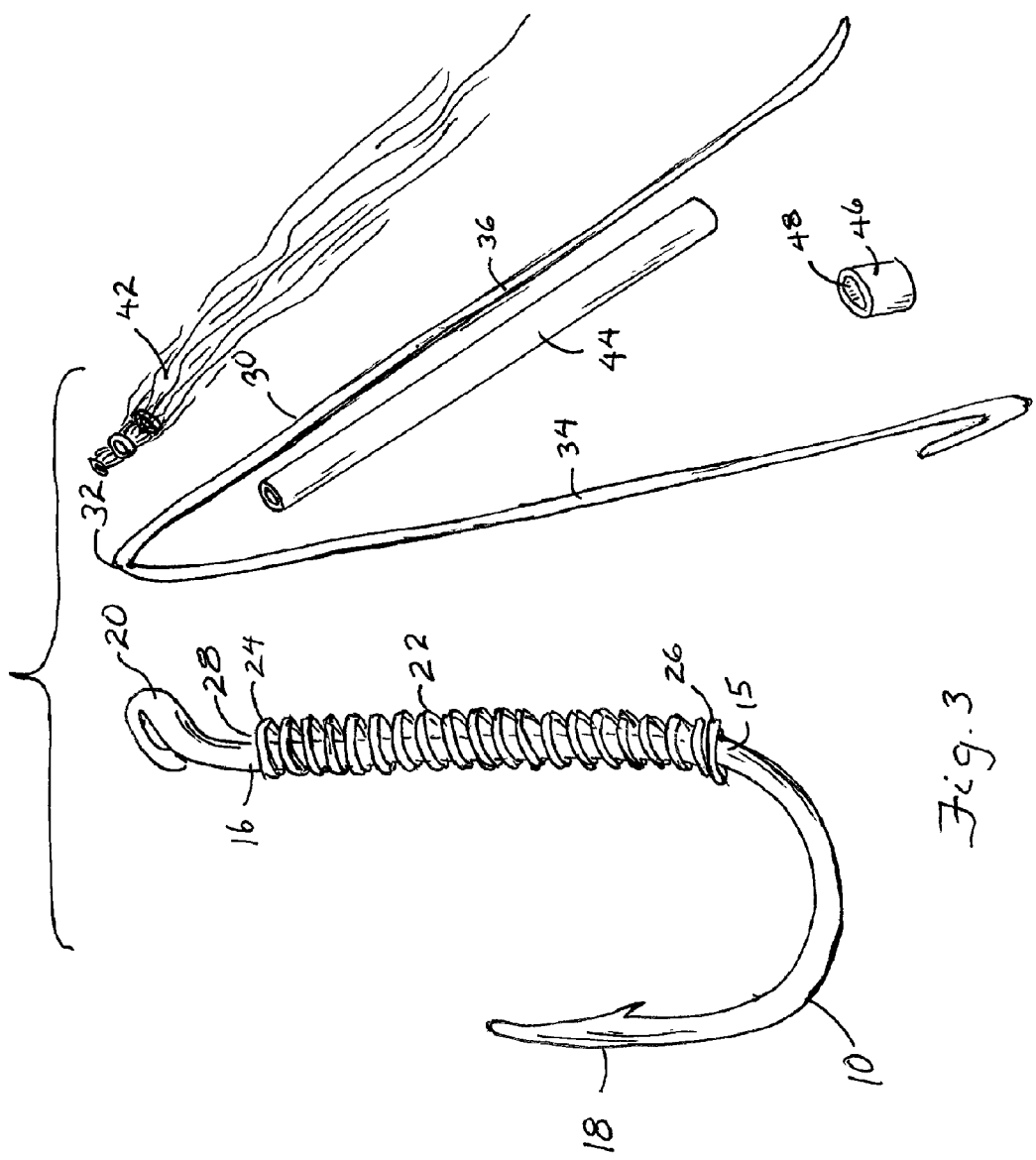
FIG. 3 is a perspective view of the fishhook of FIG. 1 showing the clip and hook members separated before assembly.

The fishhook of the present invention comprises a hook 10, a coil spring 22 with winds between first and second ends 24 and 26 defining a channel 28 longitudinal through its center, and a clip 30 to which a fish line 100 attaches. The hook 10 further comprises an elongate leg portion, or hook shank 12 with first and second ends 14 and 16 with a hook member 18 on the leg first end 12 and an eye 20 on the leg second end 16. The clip 30 resiliently bends at a point of flexure 32 into elongate first and second clip members 34 and 36 with proximal ends at the point of flexure 32 and with distal ends away from the point of flexure 32 each with latching members 38 and 40 that match to latch the first and second clip members 34 and 36 together nominally at their distal ends.

The elongate leg portion 12 of the hook member 18 passes through channel 28 of spring 22, stopped by the eye 20 larger than the spring diameter as a first spring block. The clip 30 passes through the eye and through the spring first end 24 and downward through the spring center channel 28 and out the spring second end 26, extending beyond spring upper and lower ends 24 and 26. Clip member latching members 34 and 36 latch together at a latch point nominally at the spring second end 26 forming a second spring block and constraining the spring between the latching members 34, 36 and the eye 20 or equivalently, the point of flexure 32. The hook 10 is prevented from twisting and possibly moving past the clip point of flexure 32 as the clip member 34 and the hook leg portion 12 are constrained by the spring 22 to remain side by side in the spring channel 28.

When the clip members 34 and 36 are unlatched, a fishing aid 42 can be inserted over clip member 36, the member not inserted through the spring 22. The fishing aid 42 may comprise bait, a fishing lure, a float and/or weights and other similar fishing aids. When the clip 30 is latched closed, the fishing aid 42 is secured to the fishhook. To support the fishing aid 42 on the clip member 36 such as to maintain the fishing aid 42 near the point of flexure 32, or alternatively near the latching members 38 and 40, a sleeve 44 is inserted over the clip member 36 before or after the fishing aid 40 maintaining the fishing aid 42 apart from, or in the alternate, near the latching members 38 and 40. To assure that the latching members 38 and 40 remain latched against twisting motions of the fishhook, an elastic tube 46 is releasably installed over the latching members with the clip 38 and 40 with the clip members 34 and 36 passing through a tube channel 48.

In operation, a fish line is attached to the clip at the point of flexure 32 so when a fish engages the hook member 18, it pulls the hook member 18 away from the clip point of flexure 32 compressing the coil spring 22 within its elasticity between the eye 20 and the latching members 34, 36 as stops at coil ends 24 and 26.

For all purposes herein, the term "eye" is meant to include any element securing an elongate member thereto in slidable engagement therewith. Typically, an eye is an annulus with a centric hole through which the elongate member passes.

What is claimed is:

1. A spring augmented fishhook comprising
a hook having first and second ends with a hook member on its second end,
a clip to which a fishing line attaches,
a resilient spring connected between the clip and the hook member first end, such that when the hook is pulled downward such as by a fish, the spring deforms within its elasticity between the clip and the hook allowing limited movement of the hook against spring bias and moderating impact of the fish on the hook, wherein the resilient spring comprises a coil spring with winds between first and second ends and defining a channel through its center between first and second ends, wherein a portion of the clip passes through the spring channel, wherein the clip comprises a spring block at its first end preventing the spring from passing off the clip, and wherein the clip comprises a bend at a point of flexure intermediate the clip that divides the clip into first and second legs with latch members that match to latch the legs together at a latch point a distance from the point of flexure, the spring retained between the point of flexure and the latch point.

2. A spring augmented fishhook comprising a hook having first and second ends with a hook member on its second end, wherein the hook comprises a first spring block at its first end preventing the spring from passing off the hook first end, a clip to which a fishing line attaches, a resilient spring connected between the clip and the hook member first end, such that when the hook is pulled downward such as by a fish, the spring deforms within its elasticity between the clip and the hook allowing limited movement of the hook against spring bias and moderating impact of the fish on the hook, wherein the resilient spring comprises a coil spring with winds between first and second ends and defining a channel through its center between first and second ends, wherein a portion of the clip passes through the spring channel, wherein the clip comprises a second spring block at its first end preventing the spring from passing off the clip, and wherein the clip and a shank of the hook pass through the spring channel from opposite spring ends with the spring between first and second spring blocks, and wherein the clip comprises a bend at a point of flexure intermediate the clip that divides the clip into first and second legs with latch members that match to latch the legs together at a latch point a distance from the point of flexure, the spring retained between the point of flexure and the latch point, said shank of the hook passing through the spring channel slidably side by side with said clip portion passing through the spring channel.

3. The fishhook of claim 2 wherein the first spring block comprises an eye through which passes said clip portion passing through the spring channel, preventing the hook from moving past the clip point of flexure as said clip portion passing through the spring channel and said shank of the hook passing through the spring channel are constrained by the spring to remain side by side.

4. A spring augmented fishhook comprising a hook member further comprising an eye on a first end of an elongate leg portion and a hook on a second end of the leg portion, a coil spring having a diameter smaller than the eye and forming a spring channel longitudinal through its center through which the elongate leg portion passes, a clip resiliently bending at a point of flexure into elongate first and second clip members with proximal ends at the point of flexure and with distal ends away from the point of flexure, the first clip member passing downward through the eye and then through the channel and extending beyond spring upper and lower ends with a first latch member on its distal end, and the second clip member extending generally downward with a second latch member on its distal end matching the first latch member such that the first and second latch members latch together as the first and second clip members are urged together under flexure, the spring held on the hook member leg portion between the eye and the latched first and second clip members as spring stops such that when the hook is pulled downward such as by a fish with the clip stationary relative to the hook member, the spring compresses between the eye and the latched clip members allowing limited movement of the hook against spring bias when initially pulled.

5. The fishhook of claim 4 further comprising a fishing aid attachment member to which may be attached a fishing aid without retying a fishing line secured to the clip.

6. The fishhook of claim 5 wherein said fishing aid attachment member comprises said second clip member.

7. The fishhook of claim 6 further comprising a sleeve insertable over said second clip member maintaining said fishing aid attachment member on a selective portion of the second clip member.

8. The fishhook of claim 4 further comprising a tube releasably installed over the latch members with said clip members passing through a tube channel.

\* \* \* \* \*